United States Patent
Kearns et al.

(10) Patent No.: US 8,616,074 B2
(45) Date of Patent: Dec. 31, 2013

(54) IN-LINE PIGGABLE WYE FITTING, APPARATUS AND METHOD

(75) Inventors: John P. Kearns, League City, TX (US); Roel Delgado, Jr., Alvin, TX (US); Christian G. Larsen, League City, TX (US)

(73) Assignee: Team Industrial Services, Inc., Sugar Land, TX (US)

( * ) Notice: Subject to any disclaimer, the term of this patent is extended or adjusted under 35 U.S.C. 154(b) by 536 days.

(21) Appl. No.: 12/907,802

(22) Filed: Oct. 19, 2010

(65) Prior Publication Data

US 2012/0090414 A1   Apr. 19, 2012

(51) Int. Cl.
*F16L 55/46* (2006.01)
*F16L 101/30* (2006.01)

(52) U.S. Cl.
CPC .............. *F16L 55/46* (2013.01); *F16L 2101/30* (2013.01)
USPC .......... 73/865.8; 137/559; 137/584; 137/798; 285/284.1

(58) Field of Classification Search
CPC ......... F16L 45/00; F16L 55/26; F16L 55/265; F16L 55/46; F16L 2101/12; F16L 2101/30; G01M 99/00
USPC ................................. 73/865.8–865.9, 866.5; 104/138.1–138.2; 105/365; 137/559, 137/583–584, 798; 138/108; 285/284.1, 285/FOR. 101
See application file for complete search history.

(56) References Cited

U.S. PATENT DOCUMENTS

| | | | | | |
|---|---|---|---|---|---|
| 3,186,014 | A | * | 6/1965 | Allen | 15/104.062 X |
| 3,220,432 | A | * | 11/1965 | Allen | 15/104.062 X |
| 4,531,512 | A | * | 7/1985 | Wolvek et al. | 600/18 |
| 4,724,007 | A | * | 2/1988 | Barry et al. | 15/104.062 X |
| 5,413,561 | A | * | 5/1995 | Fischell et al. | 604/167.01 |
| 5,660,202 | A | * | 8/1997 | Rush et al. | 55/46 |
| 5,728,129 | A | * | 3/1998 | Summers | 606/170 |
| 2007/0250001 | A1 | * | 10/2007 | Hilaire et al. | 604/103.04 |
| 2008/0072963 | A1 | * | 3/2008 | Strohmeier et al. | 55/46 |
| 2008/0265567 | A1 | * | 10/2008 | Morris | 55/46 |
| 2008/0319420 | A1 | * | 12/2008 | Rosenman et al. | 604/528 |

FOREIGN PATENT DOCUMENTS

CA        2744644 A1 *  6/2010

(Continued)

OTHER PUBLICATIONS

Piggable Wye by Oceaneering International, Inc.; 11911 FM 529, Houston, TX 77041; jchara@oceaneering.com; www.oceaneering.com, by Nov. 2010 2 pages.

(Continued)

*Primary Examiner* — Thomas P Noland

(57) ABSTRACT

A fitting for inserting a pig into a pipeline. The fitting comprises a cast body having a first end for connecting to a first end of a pipeline and a second end for connecting to a second end of the pipeline. The cast body further comprises a third end arranged at a predetermined angle to the first and second end of the cast body. A retractable guide within the cast body can be at least partially inserted into a run portion of the cast body for delivery or retrieval of the pig.

20 Claims, 4 Drawing Sheets

(56) References Cited

FOREIGN PATENT DOCUMENTS

| DE | 3408377 A1 | * | 9/1985 |
| DE | 102008059061 A1 | * | 5/2010 |
| EP | 2151617 A1 | * | 2/2010 |
| JP | 02179446 A | * | 7/1990 |
| WO | WO 2005/119117 A1 | | 12/2005 |
| WO | WO 2010029395 A2 | * | 3/2010 |
| WO | WO 2010107916 A1 | * | 9/2010 |

OTHER PUBLICATIONS

Director Bi-Directional Wye Fitting, Technical Specification; Quality Connector Systems, 7250 West 43rd, Suite 100, Houston, TX 77092; Oct. 11 2006, 3 pages.

Lee Avery and Bruce Morris; New Direction in Piggable Wye Technology; Offshore, published by PennWell Corporation; 2007 2 pages.

"Solutions for Unpiggable Pipelines",(pp. 1-8, Feb. 10, 2005, by GE), (pp. 9-40, Dec. 15, 2004 (9-34 by Greene's Energy Group), (pp. 35-40 by Uwe Strohmeier)).

* cited by examiner

IN-LINE PIGGABLE WYE FITTING, APPARATUS AND METHOD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates generally to an apparatus and method for inserting and retrieving pipeline pigs into pipelines, and more specifically to an apparatus and method for installing an in-line piggable wye fitting into a pipeline for the insertion and removal of in-line inspections tools.

The primary purpose of pipeline pigs is to clean and obtain vital information concerning the integrity of the pipeline. The pigs used in most oil and liquid products pipelines are typically used to remove paraffins, sludge, and water from the pipeline. The most common pigs that are used in oil and liquid products pipelines are in the shape of spheres or bullets that are made of a polyurethane material. As a result, these foam pigs are lightweight, easy to work with, and able to negotiate uncommon piping, fittings, and valves. Other types of cleaning pigs are solid cast pigs and steel mandrel scraper pigs. In other applications, such as oil and gas and natural gas pipelines, intelligent pigs (also called in-line inspection (ILI) tools) are used to determine the integrity of the pipe wall for such conditions as corrosion, wall thinning, and other defects that may affect the pipeline operations. Common types of these intelligent pigs include ultrasonic (UT) and magnetic flux leakage (MFL) induced sensors, such as the SmartScan sensors made by GE and many others well known in the art.

A pig must be launched into the pipeline for cleaning or inspection (typically by a launching station) and removed from the pipeline (typically by a receiving station) to allow for normal operation of the pipeline when the pig is in the pipeline. The pig is typically introduced into the pipeline by means of a bypass loop that diverts the flow of the pipeline product to the launch vessel by the use of valves and other pipeworks. When the pipeline product is diverted to the launcher, a valve downstream of the launcher is opened and the pig is introduced into the pipeline by means of the launching station. In most cases, the tool travels along the length of the pipeline with special seals that allow the product flowing in the pipeline to push the tool. As the tool travels, it cleans the pipeline and/or performs inspections on the pipeline and is received into the receiving vessel at the end of the pipeline run. The receiver is similar to the launcher in that a bypass loop is established with valving and pipeworks to divert the tool into the receiver without substantially disrupting the pipeline operations. In most oil and liquid products pipelines, launch and receive stations are permanently installed at various locations during installation of the pipelines to allow the cleaning of paraffin deposits and other mineral build-ups. Because the valving and pipeworks of these pipeline systems were designed for the use of pigs (i.e., the valves in these pipelines typically include an orifice the same size as the internal pipeline and consistently sized piping was used between launch and receive stations), the pigs are able to inspect a long length of pipeline between the launch and receive stations.

The most comprehensive method to give an overall assessment of a natural gas and crude pipeline is to run intelligent pigs that can map many inspection points along the internal length of the pipeline. The challenge in using intelligent pigs in these pipelines is the piping configurations that prevented previous technologies from gathering the required information on a cost effective basis, often called "unpiggable" pipelines. Pipelines can be "unpiggable" for a variety of reasons, including changes in diameter (because of compressibility of gas, the use of multi-diameter pipes is common), presence of unsuitable valves, tight or mitered bends (less than three diameters), low operating pressure, low flow or absence of flow, lack of launching and receiving facilities, dented or collapsed areas, and excessive debris or scale build-up. Natural gas pipelines are particularly known for having a high number of "unpiggable" pipelines. Further, in natural gas pipelines, products rarely produced deposits onto the pipe walls and did not require cleaning during the service life of the pipelines. Thus, the use of pipeline cleaning or in-line inspection pigs, and the use and installation of launch and receive stations, were traditionally not common in natural gas pipelines. Rather, the integrity of the pipeline was monitored by various means such as by using sacrificial corrosion coupons (e.g., pipe samples taken from the pipeline wall), visual inspection, and/or digs to perform pipe wall thickness analyses to predict corrosion rates. Unfortunately, these methods are only indicative of the conditions at the specific spots of inspection.

Techniques were developed for a method and system that uses "hot tap" technology to access the existing pipeline by adding a new connection to the pipeline without interruption of service. In this technique, after a 45 degree hot tap is made in the pipeline, a chute housing is connected to the hot tap valve. The chute within the housing is inserted through the hot tap valve to provide a path for the inspection tool to follow into the pipeline. After the chute is inserted, the bypass piping with the launch vessel is assembled to the pipeline and chute housing, and gas is allowed to flow from the pipeline so as to enter behind the inspection tool. The mainline valve is closed and the bypass valve is opened launching the tool into the pipeline. The inspection tool proceeds through the pipeline performing pipeline integrity tests and then is removed from the pipeline when it enters into the receiver station that is substantially similar to the launch station. At both the launching and receiving sites, the chute is retracted and the chute housing and associated pipeworks are removed prior to insertion of the completion plugs. The completion plugs are set to allow the hot tap valves to be removed. Once the completion plug is set, a blind flange is installed and the pipeline can be covered. A similar system is described in WO 2005/119117, incorporated herein by reference.

Although this "hot tap" method has been used in industry, it suffers from numerous and significant disadvantages. The complexity of the hot tap technique for insertion of launch and receive vessels to be connected to chute housings requires customization for every application. Another primary disadvantage is that the equipment for introducing and retrieving an inspection tool into and from a pipeline by the hot tap method are extremely large and heavy. The chute housings with the actuators can extend over 50 feet above the pipeline requiring considerable lifting capabilities as well as supports for the equipment. Using this equipment requires detailed planning for transportation, assembly, and use, such as acquiring right of ways for transportation of the equipment to the work site. Additionally, the equipment is limited in application due to the complexity of the tool geometry, which lends itself to larger diameter pipelines, so inspection tools typically cannot not be inserted into smaller diameter pipelines according to this "hot tap" method. Another problem is the high cost for the use of such chute housings and launch and receive vessels and associated methods for use and installation. Typical launch/receive stations (including the chute housings) for this "hot tap" method require a large investment in piping and facilities with little payback, and often run into the millions of dollars per station. As a result, many pipelines cannot be efficiently and/or effectively inspected, if even inspected at all.

What is needed is an apparatus and method for inserting a pig or inline inspection tool into a pipeline that will simplify the design, installation, and operation of fittings and associated pipeworks for launching/receiving inspection tools, reduce installation time of such equipment, reduce the equipment size, allow for temporary launch/receive facilities, reduce capital and operating costs, allow for inspection of previously unpiggable pipes (such as smaller diameter pipelines), and allow for more frequent and easier insertion and removal of tools into the pipeline.

DETAILED DESCRIPTION OF THE INVENTION

Figure 1:
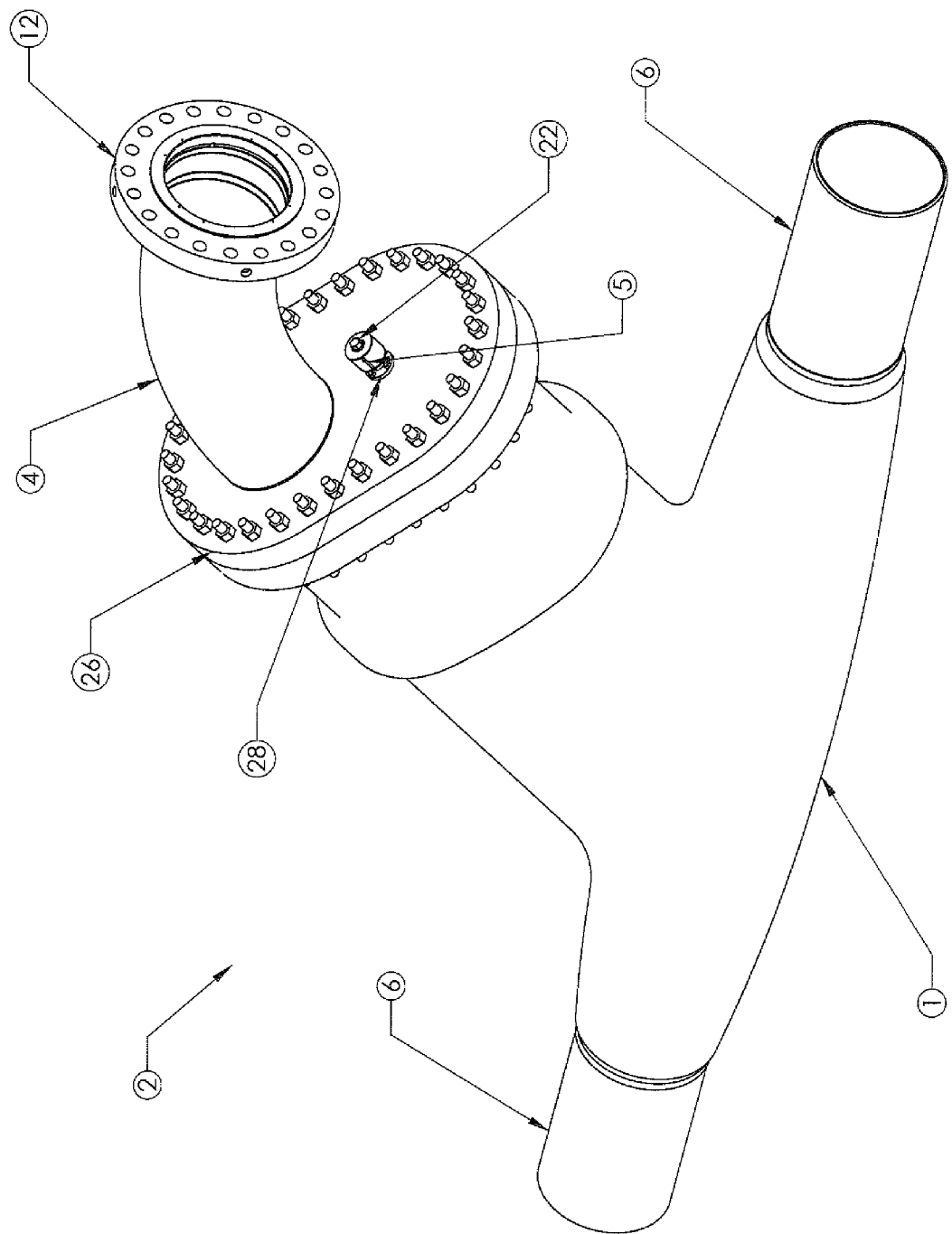
FIG. 1 illustrates a preferred embodiment of the present invention including an exterior view of the in-line piggable wye fitting.

Referring to FIG. 1, a preferred embodiment of the present invention is illustrated. FIG. 1 shows an in-line piggable wye fitting 2, including sweep piping 4, pup piping 6, wye body 1, and flange 12 attached to an extended branch of sweep piping 4 that is inset into wye body 1 (the inset being shown in more detail in FIGS. 2-3). Piggable wye fitting 2 allows the insertion and retrieval of a pig or inspection tool into a pipeline. Pup piping 6 (a first fitting portion of wye fitting 2) is preferably the same diameter and material as the pipeline to which pup piping 6 is connected and is substantially straight and parallel to the pipeline to which it is connected so as to not impede flow in the pipeline during normal operation. Indeed, pup piping 6 can alternatively be the pipeline itself. Pup piping 6 connects piggable wye fitting 2 and the launch/receive vessel (not shown) to the pipeline by means of welding and/or flanged ends. The piggable wye fitting 2 in combination with a launch or receive vessel and corresponding pipeworks is generally termed a launch or receiving station.

As indicated, in one embodiment pup piping 6 is preferably connected to the pipeline by welding or flanging each end of pup piping 6 directly in-line to the pipeline. Thus, a first end of pup piping 6 may be connected to a first end of the pipeline, and a second end of pup piping 6 may be connected to a second end of the pipeline to permit normal operation of the pipeline through wye body 1 and pup piping 6. This portion of wye body 1 between the first and second ends of pup piping 6 is referred to as the run portion of wye body 1. Sweep piping 4 (a second fitting portion of wye fitting 2) is inset into wye body 1 and connects wye fitting 2 to launch or receive facilities through flange 12. In a preferred embodiment, wye body 1 is a cast body, to which flange 26 is bolted and sweep piping 4 is inset.

In a preferred embodiment, sweep piping 4 is the same diameter and material as the pipeline to which pup piping 6 is connected. Guide feed 8 (shown in FIGS. 2A and 2B) extends and withdraws guide 32 (shown in FIGS. 2A and 2B) into and out of the run portion of wye body 1 in order to divert the pipeflow into sweep piping 4 and the inspection tool into or out of the launch or receive vessels. Depending on the directional flow of fluid in this portion of wye body 1, the orientation of wye fitting 2 as shown in FIG. 1 can be connected to either the launching vessel or the receiving vessel.

In a preferred embodiment, wye fitting 2 has a radial sweep of three pipe diameters as measured between pup piping 6 and sweep piping 4. Such a radial sweep allows current technology inspection tools (that often have multi-units forming a train of sensing hardware) to more easily navigate into and out of the pipeline. In this embodiment, the wye body 1 is made, or cast, with a predetermined angle (identified as angle A in FIGS. 2A and 2B) with a radius of three times the nominal line size to allow for the inspection tool to enter and exit the pipeline, such as approximately a 45 degree angle.

Figure 2A:
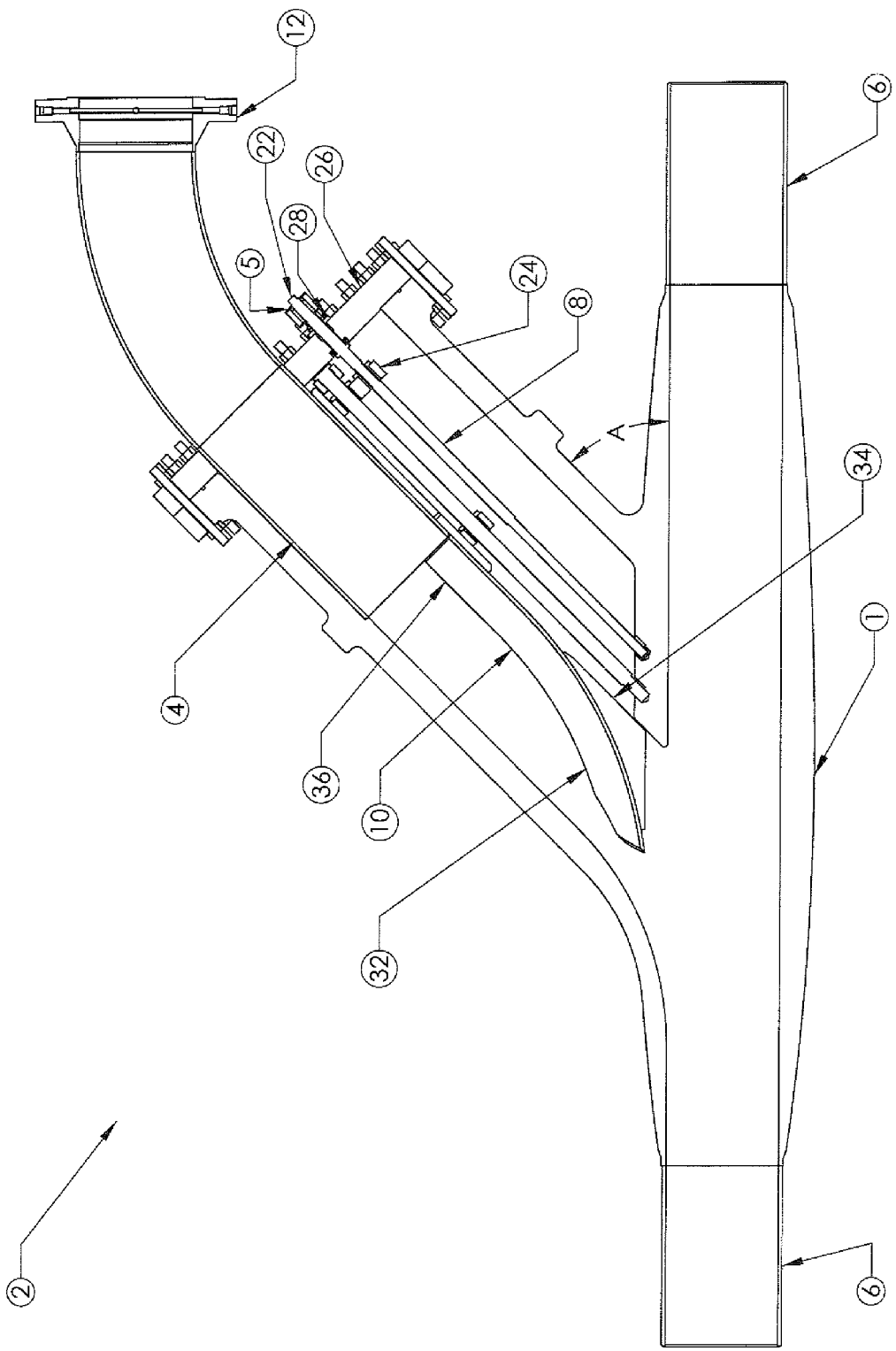
FIG. 2A illustrates a cross-sectional side view of the piggable wye fitting shown in FIG. 1 with the guide withdrawn from the pipeline.
Figure 2B:
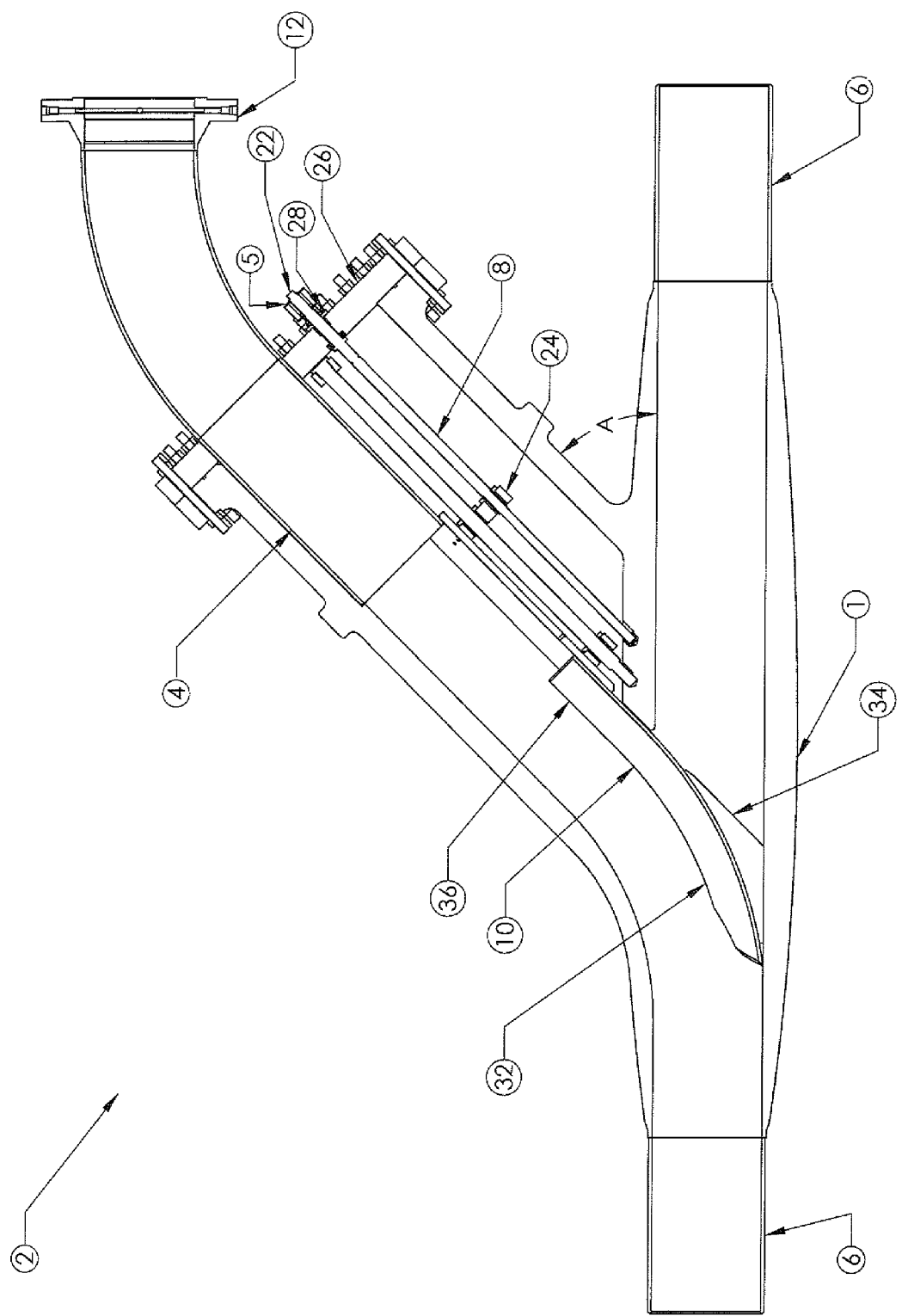
FIG. 2B illustrates a cross-sectional side view of the piggable wye fitting shown in FIG. 1 with the guide extended into the pipeline.

Referring to FIGS. 2A and 2B, a preferred embodiment of the present invention is illustrated showing cross-sectional side views of piggable wye fitting 2 with guide 32 withdrawn from (FIG. 2A) and extended into (FIG. 2B) the run portion of wye body 1. Piggable wye fitting 2 as illustrated in FIGS. 2A and 2B includes sweep piping 4, pup piping 6, guide feed 8, wye body 1, and guide assembly 10. In a preferred embodiment, guide feed 8 includes feedscrew shaft 22, feednut 24, gasketed plate 26, and packing gland 28. In this embodiment, the housing of guide feed 8 is cast wye body 1, as shown in FIG. 1. The top of guide feed 8 is enclosed by gasketed plate 26 that is bolted to wye body 1. Feedscrew shaft 22 can be rotated (by way of a rotator attached to feedscrew shaft 22) counter-clockwise a predetermined amount of turns until the guide is completely withdrawn into the fitting housing of guide feed 8 so as to not impede pipe flow, or conversely rotated clockwise for extension into what is effectively an extension of pup piping 6.

A few examples of such a rotator include a handle or wheel, which can be attached to a portion of feedscrew shaft 22 that extends through gasketed plate 26. An indicator 5 can be located on the outer feedscrew extension that shows how deep the guide is placed into the pipeline. Packing gland 28 encases elastomeric seals in gasketed plate 26 and against feedscrew shaft 22. Guide feed 8 is connected to guide assembly 10 by a feed attachment such as feednut 24, which is preferably attached to guide assembly 10 by screws and is preferably made of a brass alloy to aid in lubrication and ensure an even actuation of guide feed 8. Guide assembly 10 includes guide 32, guide support 34, and guide extender 36. Guide 32 is extended into the run portion of wye body 1 by guide feed 8 to divert the pipeflow into sweep piping 4 and an inspection tool into or out of the launch or receive vessels and the pipeline. Guide 32 is attached to guide extender 36, which is connected to feednut 24. In one embodiment, guide extender 36 is rolled plate that conforms to the outside diameter of the sweep piping 4. Guide support 34 is attached to the bottom of guide 32 to provide support and a positive stop of guide 32 at the bottom of the pipeline wall of pup piping 6.

It will be apparent to one of ordinary skill in the art that the specifications of wye fitting 2 can be modified for insertion or extraction of an inspection tool into a pipeline depending on the particular situation. For example, the neck of sweep piping 4 and feedscrew 22 can be extended to allow for operation of the wye fitting above ground level that does not require excavation during use. In another embodiment, rather than using a feedscrew to position a guide into the pipeline, a swing check can be utilized that retracts and extends guide assembly 10 into the pipeline.

Figure 3:
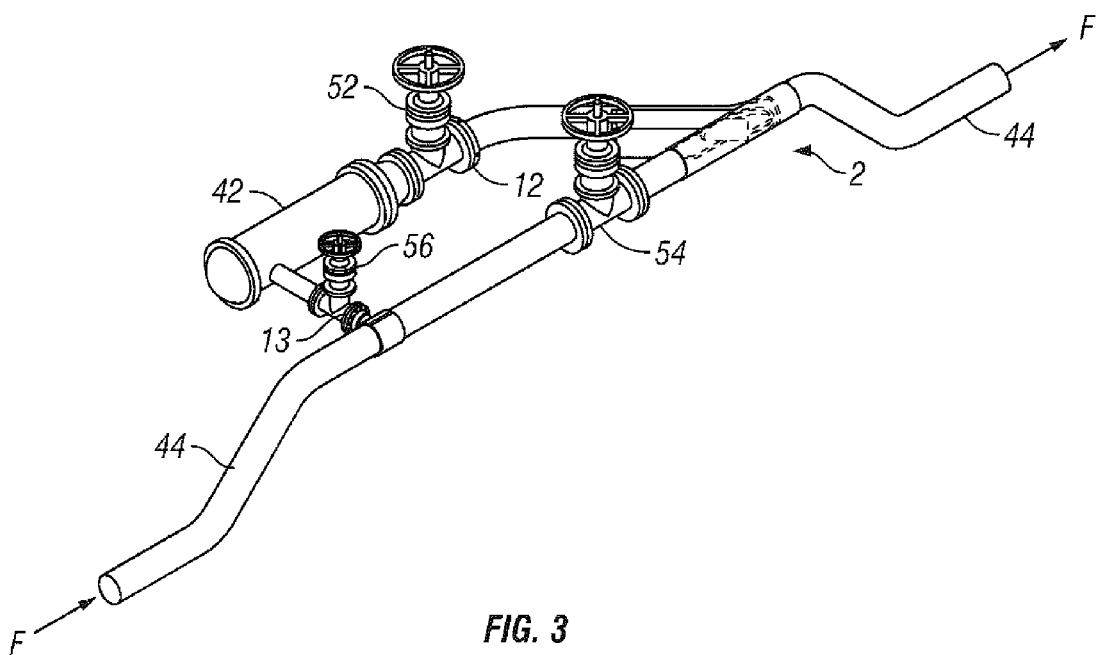
FIG. 3 illustrates a preferred embodiment of the piggable wye fitting shown in FIG. 1 connected to a pipeline with a launch vessel and temporary valving.

FIG. 3 illustrates a preferred embodiment of the piggable wye fitting shown in FIG. 1 connected to a launch vessel and corresponding pipeworks to allow for normal operation of the wye fitting. As depicted in FIG. 3, the orientation of wye fitting 2 along with flow F of pipeline fluid indicates that the wye fitting is to be utilized in a launching station for the introduction of an inspection tool or pig into the pipeline. It will be apparent to one of ordinary skill in the art that the orientation depicted in FIG. 3 can be reversed to utilize the piggable wye fitting in a receiving station setup. It will also be apparent to one of ordinary skill in the art how the arrangement and operation of the launching/receiving vessels and valves and other associated pipeworks operate in conjunction with the piggable wye fitting.

Figure 4:
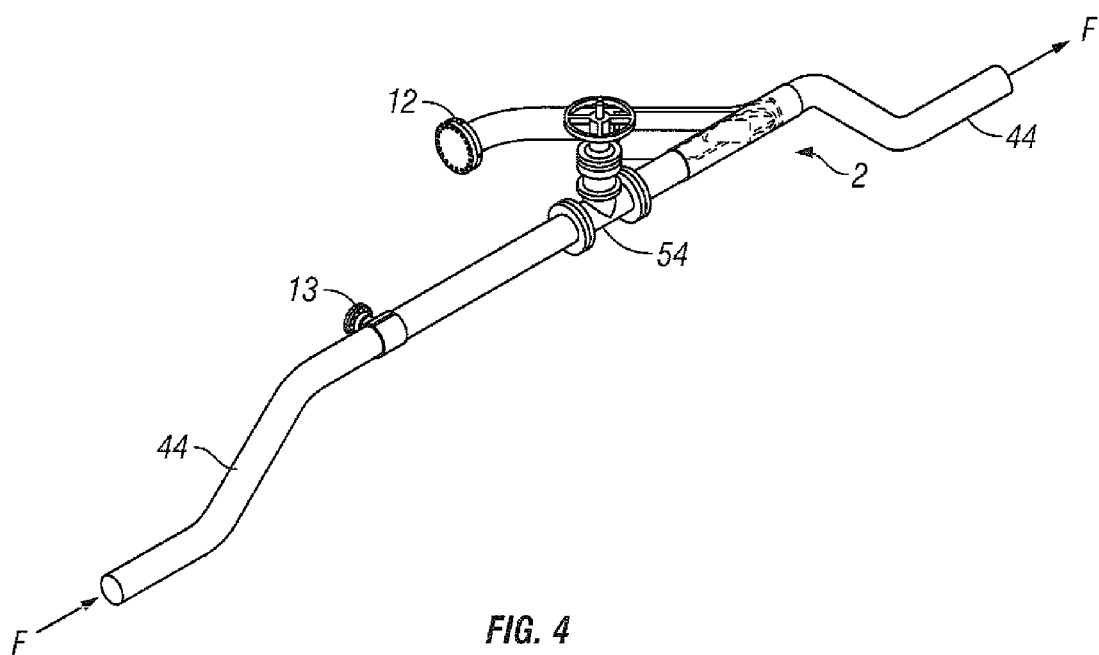
FIG. 4 illustrates a preferred embodiment of the piggable wye fitting shown in FIG. 1 connected to a pipeline without a launch vessel and temporary valving.

As shown in FIG. 3, in-line piggable wye fitting 2 is installed on pipeline 44 and connected to launch vessel 42. Mainline valve 54 is connected to pipeline 44 and exists on the pipeline upstream of piggable wye fitting 2. Bypass valve 56 is connected to pipeline 44 via bypass flange 13 and launch vessel 42 and exists on pipeline 44 upstream of piggable wye fitting 2 and mainline valve 54. It will be apparent to one of ordinary skill in the art that launch vessel 42 can be a common launching vessel for the introduction of pigs or in-line inspections tools into a pipeline, and that its specifications may vary depending upon the requirements of the pipeline, pipeline fluid, and/or inspection tool. Full port ball valve 52 is connected on one end to flange 12 of wye fitting 2 and on the other end to launch vessel 42. In a preferred embodiment, wye fitting 2 stays permanently connected to pipeline 44 during normal operation of the pipeline by keeping the guide withdrawn from the pipeline so as to not impede pipeline flow. Before an inspection tool has been inserted into the pipeline (or after an inspection tool has been utilized and removed from the pipeline), launch vessel 42, full port ball valve 52, and bypass valve 56 are not needed for normal operation of the pipeline and can be removed from the piping configuration (as shown in FIG. 4). In this situation, flange 12 of wye fitting 2 and bypass valve flange 13 are temporarily capped until the launch vessel and corresponding valves and pipeworks need to be re-assembled for insertion or retrieval of the inspection tool.

In another preferred embodiment, a method is used to directly insert and retrieve an inspection tool into a pipeline according to the following procedure. In operation, and after a piggable wye fitting 2 and necessary pipeworks has already been connected to a pipeline using procedures described above and well known to those of ordinary skill in the art, full port ball valve 52 is bolted to flange 12. A completion plug setter is removed through valve 52, valve 52 is closed, and the completion plug setter is bled down of internal pressure. Launch vessel 42, bypass valve 56, and other pipeworks are connected to pipeline 44 and full port ball valve 52 using procedures well known to those of ordinary skill in the art. A similar operation is repeated downstream at an equivalent receiving station. After the inspection tool is assembled in launch vessel 42, and with bypass valve 56 and full port ball valve 52 opened according to procedures well known to those of ordinary skill in the art, mainline valve 54 is slowly closed, reducing flow in the pipeline at guide 32. Once the flow has been diverted, guide 32 is linearly actuated into the pipeline by rotating feedscrew 22 clockwise a predetermined number of turns until guide support 34 rests on the bottom of the inside pipe wall of pup piping 6. The guide is at this point set and able to steer the pig or inspection tool into the main pipeline. The tool is allowed to travel through the pipeline and inspect the pipeline according to procedures well known in the art.

A similar installation and operation procedure is repeated at the receiving station to allow the inspection tool to exit the main pipeline through a second piggable wye fitting into a receiving vessel. When the inspection tool is received into the receive vessel, the pipeline can be restored to normal operation and the guide can be withdrawn from the pipeline by rotating the feedscrew counter-clockwise a predetermined amount of turns until the guide is completely withdrawn so as to not impede pipeline flow.

In another preferred embodiment, a method is used to insert the piggable wye fitting into an existing and operational line according to the following procedure. Line stops are installed near the proximity of the location where piggable wye fitting is to be installed. A bypass loop around the insertion point of the piggable wye fitting can be established through the line stops. The piping between the line stops is de-pressurized, the necessary amount of pipeline between the line stops is removed, and a piggable wye fitting is installed in the removed portion of the pipeline by welding the ends of the piggable wye fitting pup piping to the ends of the pipeline. The mainline pipe is pressured between the line stops and the line stops are removed. Completion plugs are installed at all necessary locations and the site is returned to normal conditions. An inspection tool can be inserted into and retrieved from the pipeline according to the procedures described above.

It will be apparent to one of skill in the art that described herein is a novel apparatus and method for inserting and retrieving an in-line inspection tool into a pipeline by the use of an in-line piggable wye fitting. While the invention has been described with references to specific preferred and exemplary embodiments, it is not limited to these embodiments. For example, it will be apparent to one of skill in the art that the piggable wye fitting can be installed in new construction or as a retrofit to an existing pipeline. The invention may be modified or varied in many ways and such modifications and variations as would be obvious to one of skill in the art are within the scope and spirit of the invention and are included within the scope of the following claims.

The invention claimed is:

1. A fitting for inserting a pig into a pipeline, comprising:
a cast body having a first end and a second end, the first end for connecting to a first end of the pipeline and the second end for connecting to a second end of the pipeline;
a third end of the cast body arranged at a predetermined angle to the first and second end of the cast body; and
a retractable guide within the cast body for guiding the pig into a run portion of the cast body.

2. The fitting of claim 1, wherein the predetermined angle is approximately 45 degrees.

3. The fitting of claim 1, wherein the pig is an in-line inspection tool.

4. The fitting of claim 3, wherein the guide can be extended into the run portion of the cast body by a guide feed.

5. The fitting of claim 4, wherein the guide feed comprises a feedscrew.

6. The fitting of claim 5, wherein the feedscrew can be rotated to position the guide at least partially in the run portion of the cast body.

7. The fitting of claim 4, wherein the guide feed is arranged in a housing external to a housing of the retractable guide.

8. The fitting of claim 3, wherein the guide can be extended into the run portion of the cast body by a swing check valve.

9. The fitting of claim 1, wherein the pig can be introduced into the pipeline through at least the run portion of the cast body.

10. The fitting of claim 1, wherein the first end and second end of the cast body is in-line with the pipeline.

11. The fitting of claim 10, wherein the first end and second end of the cast body is substantially parallel to the pipeline.

12. The fitting of claim 10, wherein the third end is arranged for connecting to one of a (i) launch vessel or (ii) receiving vessel.

13. A method for inspecting a pipeline, comprising:
operatively connecting a wye fitting to a pipeline that is to be inspected, wherein the wye fitting comprises:
a cast body having a first end and a second end, the first end for connecting to a first end of the pipeline and the second end for connecting to a second end of the pipeline;
a third end of the cast body arranged at a predetermined angle to the first and second end of the cast body; and
a retractable guide within the cast body for guiding an inspection tool into a run portion of the cast body;
connecting a launch vessel to the wye fitting;
positioning the retractable guide at least partially into the run portion of the cast body;
inserting the inspection tool into the pipeline through the run portion of the cast body; and
inspecting the pipeline with the inspection tool.

14. The method of claim 13, wherein the first end and second end of the cast body is in-line with the pipeline.

15. The method of claim 13, wherein the retractable guide is positioned by a feedscrew.

16. The method of claim 13, wherein the retractable guide is positioned by a swing check valve.

17. The method of claim 13, further comprising removing the inspection tool from the pipeline.

18. A fitting for positioning a pig in a pipeline, comprising:
a body having a first end and a second end, the first end for connecting to a first end of the pipeline and the second end for connecting to a second end of the pipeline, wherein the ends are in-line to the pipeline; and
a retractable guide within the body for positioning the pig in the pipeline.

19. The fitting of claim 18, further comprising a third end of the body arranged for connecting to one of a (i) launch vessel or (ii) receiving vessel.

20. The fitting of claim 18, wherein the retractable guide is positioned by a feedscrew.

* * * * *